3,525,589
PRODUCTION OF BORON CARBIDE WHISKERS
Robert A. Clifton, Jr., Greenbelt, Md., assignor to the United States of America as represented by the Secretary of the Interior
No Drawing. Filed May 17, 1968, Ser. No. 729,903
Int. Cl. C01b *31/36*
U.S. Cl. 23—208　　　　　　　　　　　　　　3 Claims

ABSTRACT OF THE DISCLOSURE

Boron carbide ($B_4C$) whiskers having a cross-sectional area of no more than 0.2 square micron are produced by reacting vaporous boric oxide ($B_2O_3$) with a hydrocarbon gas.

---

This invention, which relates to unusually small diameter boron carbide whiskers and a process for making the same, resulted from work done by the Bureau of Mines in the U.S. Department of the Interior, and domestic title to the invention is in the Government.

It was known as early as the nineteenth century that the strength of a material increases as its crystal dimension decreases. More recently this strengthening trend has been observed to progress at a much steeper rate as crystal sizes are reduced beyond the minute proportions, for example, .0001 inch. Pursuant to this, in the past several years efforts have been made to produce many metallic and related materials in fine whisker or single-crystal filament form having diameters of a few microns or less. Such whiskers have yielded dramatic improvements in the strengths of these materials. One theory advanced with regard to the improved strength is that such whiskers possess very few crystalline imperfections which might otherwise lower tensile strength. As a result, whisker strength approaches interatomic forces.

Toward this end, boron carbide ($B_4C$) has previously been produced in filament form having a maximum length of about 1 cm. and a cross-sectional area of as little as 4.6 square microns with a resultant maximum tensile strength of 965,000 p.s.i. This is shown in "The Synthesis of Boron Carbide Filaments," Final Report, by A. Gatti et al., July 1964, prepared by NASA under Contract NASw–670. As expected, the strength of the filaments produced therein sharply varied inversely as the whisker cross-sectional area.

I have now been able to produce $B_4C$ whiskers or filaments having even a smaller cross-sectional area than those previously produced. Furthermore, my $B_4C$ whiskers are as much as ten times longer. More specifically, I have now produced $B_4C$ whiskers as long as about 4 inches having a cross-sectional area of no more than approximately 0.2 square micron. I discovered that such whiskers could be produced by reacting vaporous boric oxide ($B_2O_3$) with a hydrocarbon gas.

It is therefore an object of this invention to provide novel $B_4C$ whiskers. Another object is to provide a new process for forming $B_4C$ whiskers. other objects and advantages will be obvious from the following more detailed description of the invention.

In the practice of my invention, a hydrocarbon gas and solid $B_2O_3$ are heated together, at about atmospheric pressure, to temperatures of about 700° C. to about 1600° C., preferably about 1000° C. Natural gas or any low molecular weight hydrocarbon such as $CH_4$, $C_2H_6$, $C_3H_8$, or $C_4H_{10}$ can be used as the hydrocarbon reactant. However, $CH_4$ is economically preferable.

Heating can be effected in a steam jacketed vessel, oven or furnace containing the $B_2O_3$ in a graphite or other low-reactivity container. Other forms of heating such as induction heating or resistance coils are suitable.

At the operating temperatures, the main body of $B_2O_3$ is in molten form and exerts considerable vapor pressures whereby vaporous $B_2O_3$ reacts with the hydrocarbon. As $B_4C$ whiskers form during the vapor-vapor reaction, they deposit on graphite, mullite, $Al_2O_3$ or other substrates disposed in the heating zone.

Fibrous $B_4C$ materials will form even beyond the designated upper operating temperature of about 1600° C., but the whiskers are ribbon shaped (rather than generally cylindrical) and are shorter and fewer in number. Furthermore, operating temperatures should not be so high as to decompose the hydrocarbon reactant whereby free carbon will be produced which deposits on the fibers and is difficult to remove. Dilution of the hydrocarbon gas with hydrogen will suppress free carbon formation and permit somewhat higher operating temperatures.

Whiskers produced by the process of the invention generally vary in diameter between approximately 0.05 and approximately 0.25 micron which constitutes a cross-sectional area variation of approximately 0.002 to approximately 0.05 square micron. However, whiskers having a cross-sectional area as high as approximately 0.2 square micron can be produced. Lengths generally vary between about ½ inch to about 4 inches.

In view of their generally cylindrical configuration and ver yhigh length-to-diameter ($L/D$) ratio (over 25,000:1), the whiskers of the present invention are capable of being readily spun and woven into cables or sheets.

The following example specifically illustrates one way in which the invention has been carried out:

10 gms. of anhydrous $B_2O_3$ were placed in a graphite boat which was inserted in a horizontal tube furnace in a mullite tube. The tube was continuously purged with 2.7 liter/hr. of hydrogen and 0.52 liter/hr. of methane. Resistance heaters were used to raise the contents of the furnace to 1075° C., and this temperature was maintained for 18 hours. Thereafter, the oven was cooled to room temperature as the gas purge continued. 0.1 gram of $B_4C$ fibers were recovered from the mullite tube and the graphite boat. The whiskers, which were circular in cross section, had diameters ranging from 0.05 micron to 0.25 micron, and lengths ranging from one-half to four inches.

In view of the very small size of the whiskers of the present invention, tensile strengths of well over a million p.s.i. can be expected. Thus, the fibers can be employed as high strength reinforcement for high temperature-resistant compositions having metallic or resinous matrices. Further, the fibers can be used as loose fill or felted thermal insulation.

What is claimed is:

1. A process for producing $B_4C$ comprising reacting vaporous $B_2O_3$ with a hydrocarbon gas at a temperature of about 700° C. to about 1600° C.

2. The process of claim 1 wherein said hydrocarbon gas is selected from the group consisting of $CH_4$, $C_2H_6$, $C_3H_8$, $C_4H_{10}$ and mixtures of the same.

3. The process of claim 2 wherein said hydrocarbon gas is $CH_4$ and wherein said reaction temperature is about 1000°C.

References Cited

UNITED STATES PATENTS 3,294,880 12/1966 Turkat.
3,423,179 1/1969 Cree et al.

OTHER REFERENCES

Gatti et al.: "The Synthesis of Boron Carbide Filaments," 2nd Quarterly Report, January 1964, NASw-670, pp. 3, 4 and 7.

OSCAR R. VERTIZ, Primary Examiner

G. T. OZAKI, Assistant Examiner